United States Patent
Bednekoff et al.

(10) Patent No.: US 7,502,355 B2
(45) Date of Patent: Mar. 10, 2009

(54) ADAPTIVE MULTIPLEXING DEVICE FOR MULTI-CARRIER WIRELESS TELECOMMUNICATION SYSTEMS

(75) Inventors: George Bednekoff, Plano, TX (US); Philip B. Davis, Richardson, TX (US); Michael A. Hinz, Plano, TX (US); Viet Huynh, Murphy, TX (US); Mitchell K. Johnson, McKinney, TX (US)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 11/359,675

(22) Filed: Feb. 22, 2006

(65) Prior Publication Data

US 2006/0199592 A1    Sep. 7, 2006

Related U.S. Application Data

(60) Provisional application No. 60/658,802, filed on Mar. 4, 2005.

(51) Int. Cl.
*H04H 20/67*    (2008.01)

(52) U.S. Cl. .................. 370/339; 370/328; 370/336; 370/461; 455/137; 455/273; 455/562.1; 455/561

(58) Field of Classification Search .............. 455/450, 455/524, 561, 562.1, 137, 273; 370/339, 370/328, 461, 336, 347
See application file for complete search history.

(56) References Cited

U.S. PATENT DOCUMENTS

| | | | |
|---|---|---|---|
| 6,104,247 A * | 8/2000 | Ha ............................ 330/295 |
| 6,384,677 B2 * | 5/2002 | Yamamoto ................... 330/10 |
| 6,580,725 B1 * | 6/2003 | Phillips et al. .............. 370/461 |
| 6,658,263 B1 * | 12/2003 | Ke et al. ..................... 455/524 |
| 7,079,817 B2 * | 7/2006 | Obara et al. .................. 455/82 |
| 2002/0103012 A1 * | 8/2002 | Kim et al. ................... 455/562 |
| 2002/0137481 A1 * | 9/2002 | Chen et al. .................. 455/127 |
| 2005/0009478 A1 * | 1/2005 | Mohan et al. ............... 455/102 |
| 2005/0256409 A1 * | 11/2005 | Pomata et al. .............. 600/459 |
| 2006/0223578 A1 * | 10/2006 | Conyers et al. ............. 455/557 |

* cited by examiner

*Primary Examiner*—George Eng
*Assistant Examiner*—Marcos L Torres
(74) *Attorney, Agent, or Firm*—Edell, Shapiro & Finnan, LLC

(57) ABSTRACT

A radio frequency (RF) power combiner for connecting multiple base transceiver stations with one antenna assembly includes at least one combining device coupled to at least two base transceiver stations for combining signals generated thereby into a combined signal for being transmitted by the antenna assembly. At least one frequency selective RF power detector is coupled to one of the signals generated from one of the base transceiver stations for generating an output indicating whether the signal at a predetermined frequency is present. A logic control module is coupled to the frequency selective RF power detector for generating a control signal in response to the output of the detector. An oscillator is coupled to the logic control module for generating a carrier signal at the predetermined frequency for the combined signal in response to the control signal.

13 Claims, 2 Drawing Sheets

ADAPTIVE MULTIPLEXING DEVICE FOR MULTI-CARRIER WIRELESS TELECOMMUNICATION SYSTEMS

CROSS REFERENCE

The present application claims the benefits of U.S. Provisional Patent Application Ser. No. 60/658,802, which was filed on Mar. 4, 2005 and entitled "ADAPTIVE SIGNAL MULTIPLEXER."

BACKGROUND

The present invention relates generally to wireless telecommunication, and more particularly to an adaptive multiplexing device for multi-carrier wireless telecommunication systems.

A time division duplex (TDD) wireless telecommunication system is designed to transmit and receive signals on the same frequency in different time slots. A conventional TDD wireless telecommunication system typically includes a base transceiver station (BTS) connected to a remote antenna via a tower top amplifier (TTA) for establishing wireless communication links with one or more mobile stations (MS'). The antenna radiates and receives radio signals. The TTA amplifies the signals transmitted to or received from the antenna. The information traveling on the wireless communication links is carried by signals at the same radio frequency (RF), but in different time slots for each channel.

A multi-carrier TDD wireless telecommunication system has more than one BTS. The transmitting and receiving RF signals for more than one BTS can be combined and fed into one remote amplifier antenna assembly as long as these signals are synchronized properly. Such a multi-carrier TDD wireless telecommunication system presents a set of design challenges, such as synchronization, signal combination and split, size, performance optimnization, etc. Thus, it is desirable to design an adaptive multiplexing device that can properly combine multiple BTS' together for the multi-carrier TTD wireless telecommunication systems.

SUMMARY

The present invention discloses a radio frequency (RF) power combiner for connecting multiple base transceiver stations with one antenna assembly. In one embodiment of the invention, the combiner includes at least one combining device coupled to at least two base transceiver stations for combining signals generated thereby into a combined signal for being transmitted by the antenna assembly. At least one frequency selective RF power detector is coupled to one of the signals generated from one of the base transceiver stations for generating an output indicating whether the signal at a predetermined frequency is present. A logic control module is coupled to the frequency selective RF power detector for generating a control signal in response to the output of the detector. An oscillator is coupled to the logic control module for generating a carrier signal at the predetermined frequency for the combined signal in response to the control signal.

The construction and method of operation of the invention, however, together with additional objects and advantages thereof will be best understood from the following description of specific embodiments when read in connection with the accompanying drawings.

DESCRIPTION

Figure 1:
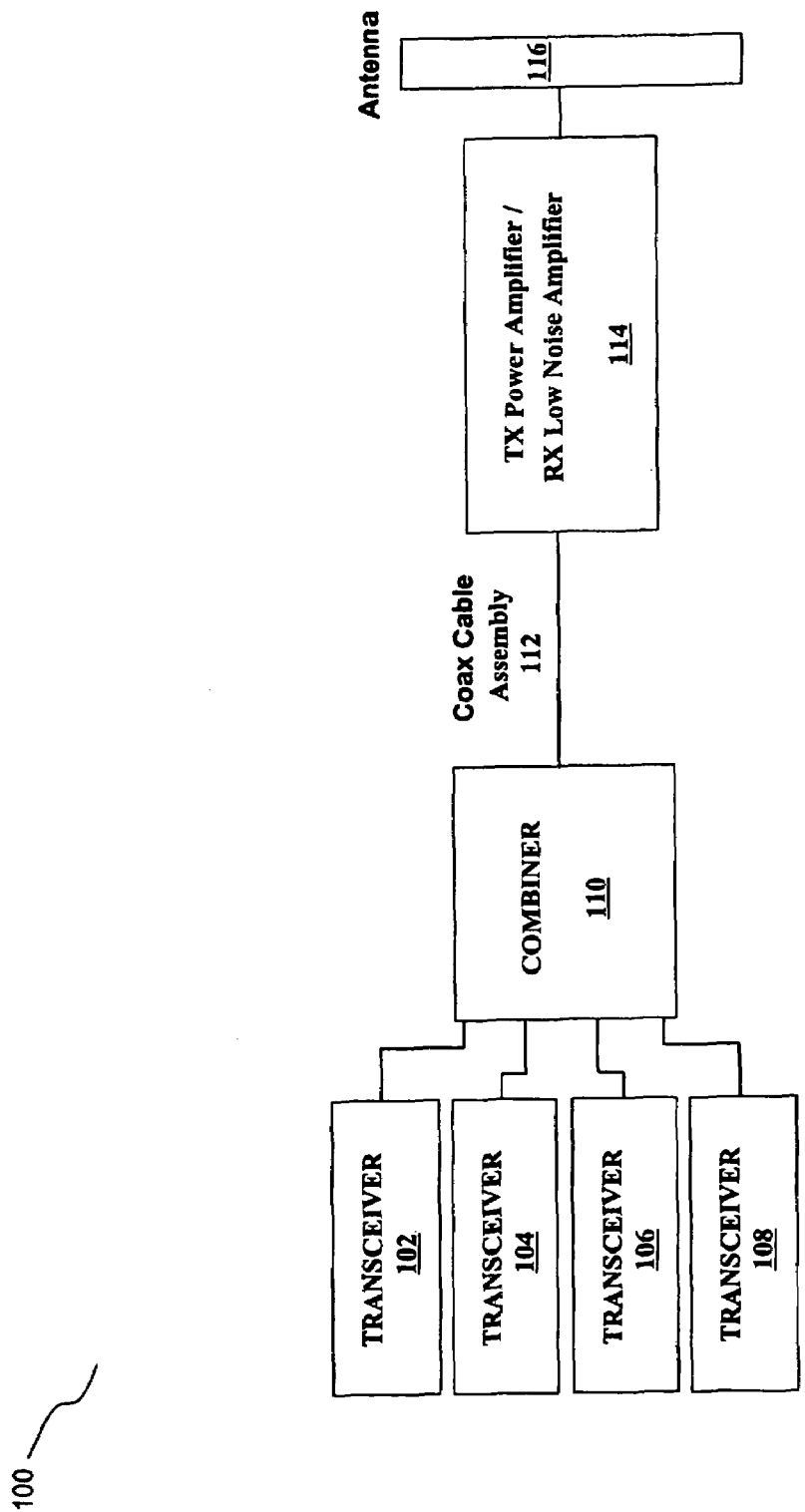
FIG. 1 illustrates a block diagram of a TDD wireless telecommunication system that includes a number of BTS' in accordance with one embodiment of the present invention.

FIG. 1 illustrates a TDD wireless telecommunication system 100 in accordance with one embodiment of the present invention. The system 100 includes, for example, four transceivers 102, 104, 106 and 108, coupled to a combiner 110 that is further connected to an amplifier 114 via a signal connection line such as a coax cable assembly 112. The transceivers 102, 104, 106 and 108 can be physically implemented in four separate BTS'. The amplifier 114 is further connected to an antenna module 116, which can be a single antenna or an antenna array.

This TDD system is designed to transmit and receive on the same frequency in different time slots. The antenna 116 is designed to both transmit and receive RF signals. The amplifier 114 is designed to be used as both a transmitting power amplifier and a receiving low noise amplifier. The amplifier 114 is connected to the combiner 110 via the coax cable assembly 112, which includes at least one cable line with a single-ended center conductor surrounded by a grounded shield conductor. The combiner 110 is coupled with the transceivers 102, 104, 106 and 108 for combining and synchronizing the RF signals received from the transceivers 102, 104, 106 and 108, and for splitting the RF signals received from the antenna 116 via the amplifier 114. It is noted that while the system 100 shows four transceivers, the number of transceivers that can be implemented is not limited as shown.

In one example of the embodiment, a standard 10.7 MHz oscillator can be used in each transceiver for generating RF signals. The combiner 110 receives DC power from one or more BTS', and combines the RF signals from the transceivers 102, 104, 106 and 108, with their timing reference signals added. The combiner 110 also includes at least one oscillator, such as the standard 10.7 MHz oscillator, that is controllably turned on and off in order to multiplex the RF signals from the transceivers 102, 104, 106 and 108 and the timing reference signals into the center conductor of the coax cable assembly 112. The amplifier 114 amplifies the RF signals received from the combiner to high power RF signals ready for transmission through the antenna 116.

In the signal receiving mode, the antenna receives RF signals. The amplifier 114 amplifies the received signals and sends them to the combiner 110 via the coax cable assembly 112. The combiner 110 functions as a splitter that de-multiplexes the amplified received signals into multiple signals for the transceivers 102, 104, 106 and 108.

Figure 2:
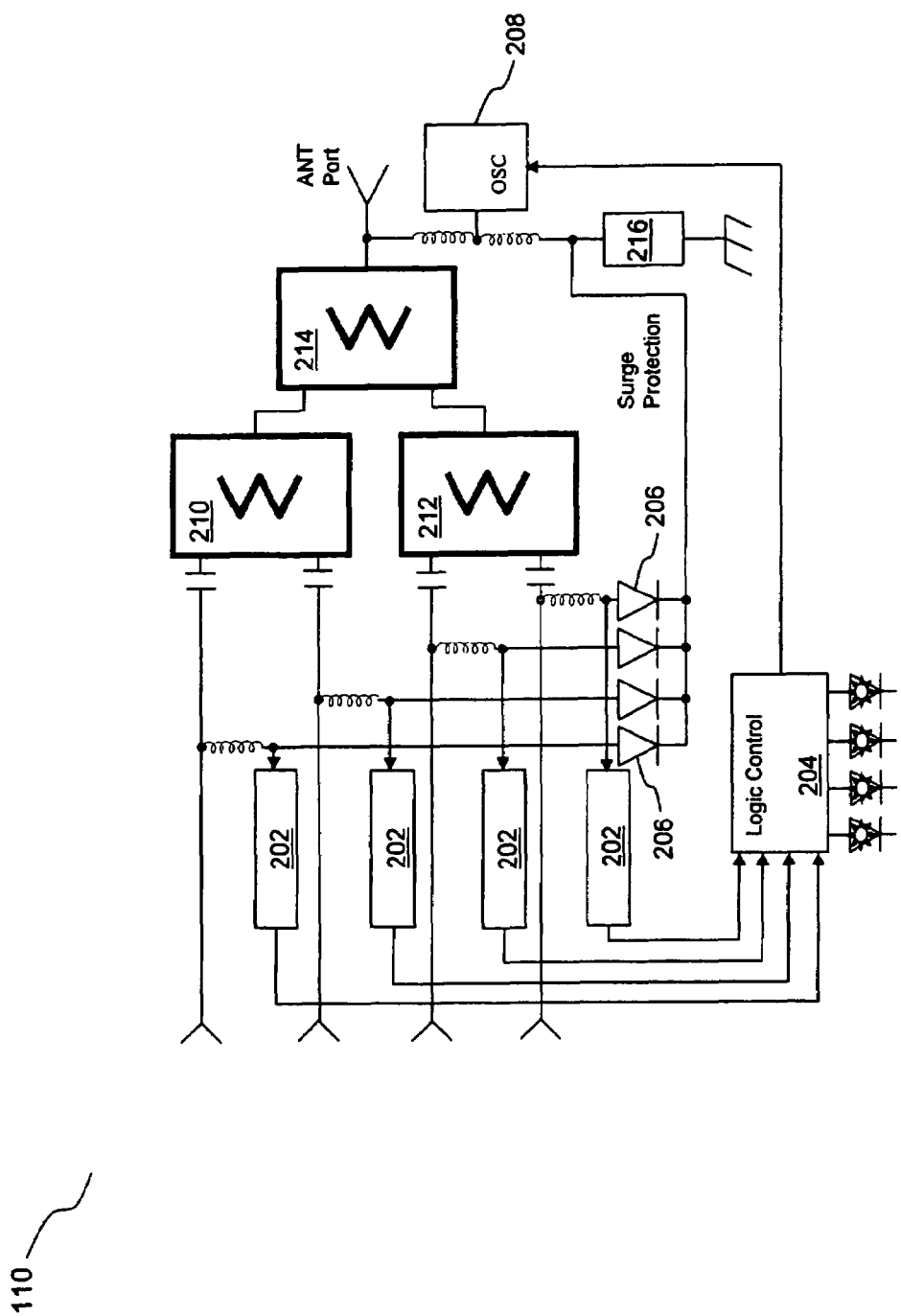
FIG. 2 illustrates a block diagram of a combiner implemented in the TDD wireless telecommunication system in accordance with another embodiment of the present invention.

FIG. 2 illustrates the combiner 110 of FIG. 1 in detail in accordance with one embodiment of the present invention. The combiner 110 includes a number of frequency selective RF power detectors 202, a logic control device 204, diodes 206, an oscillator 208, and three RF power combining devices 210, 212, and 214. As shown in FIG. 1, the combiner 110 receives four separate input signals from the four transceivers 102, 104, 106, and 108. These signals are coupled to the RF power combining devices 210 and 212 via a number of capacitors. The outputs of the RF power combining devices 210 and 212 are further coupled to the input terminals of the RF power combining device 214, which is connected to the coax cable assembly 122 shown in FIG. 1. In this embodiment, the RF power combining device 210 receives signals from two separate transceivers, which may belong to two separate BTS', and combines them together. The RF power combining device 212 receives signals from two separate transceivers, which may belong to two separate logic BTS', and combines them together. The RF power combining device 214 combines the outputs of the RF power combining devices 210 and 212, and feeds the combination of the four separate RF signals to the combiner output.

The three RF power combining devices 210, 212 and 214 can also function as a signal divider that splits RF signals received from the ANT port into four separate signals for various transceivers. It is noted that while four separate input signals are shown, the number of input signals is not so limited. When the number of signals changes, the number of RF power combining devices may need to be adjusted accordingly. For example, if eight input signals are provided, a total of seven RF power combining devices, each of which has two input terminals and one output terminal, may need to be stacked together.

Each of the signals received from the BTS' is coupled to a frequency selective RF power detector 202 via an inductor. The frequency selective RF power detectors are connected to a logic control module 204, which is further connected to an oscillator 208. The frequency selective RF power detectors 202 detect the presence or absence of RF power at a predetermined frequency and generate a digital output indicating the presence or absence of the RF signal. The logic control module 204 generates a control signal to control the ON and OFF of the oscillator 208. For example, the frequency selective RF power detector 202 can be designed to detect RF power at 10.7 MHz. The logic control module 204 will generate a control signal that turns off the oscillator generating a carrier signal of 10.7 MHz if any one of the frequency selective RF power detectors detects the absence of 10.7 MHz RF power. When 10.7 MHz RF power is detected from all BTS inputs, the logic control module 204 will generate a control signal that turns on the 10.7 MHz output.

A number of diodes 206 are coupled between the ANT port and the input terminals of the combiner 110. The cathodes of the diode 206 are connected to the ANT port through one or more inductors, and the anodes of the same are connected to the input terminal through one or more inductors. The DC power received by the combiner 110 from the BTS' can be supplied to the amplifier 114 as shown in FIG. 1, through the diodes 206. The cathodes of the diodes 206 are further connected to a surge protection device 216 for dissipating the power surge to ground during an event such as lightning. The surge protection device can be a SIDACtor device that is invisible to the combiner 110 during its regular operation. However, when the power in the combiner 110 exceeds a predetermined voltage, the SIDACtor device becomes conductive, and quickly dissipates the excessive power to ground, thereby protecting other components in the combiner 110 from high voltage induced damage.

One advantage of the TDD wireless telecommunication system is the simplified configuration. The combiner combines multiple RF signals into one signal that requires only one antenna assembly for transmission. This allows a number of BTS' to share one antenna assembly, and eliminates the need of multiple amplifiers and coax cables, thereby saving the costs and space, and better serving the aesthetic concerns. In addition, the combiner is able to receive the DC power from the BTS, and further supplies the DC power to the TTA. Moreover, the surge protection device protects the combiner from damage caused by a power surge during an event such as lightning. As such, the combiner enables the system to be designed in a simple, cost-efficient, and reliable manner.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. An apparatus comprising:
at least one combining circuit coupled to receive a plurality of RF signals each at the same frequency, wherein the plurality of RF signals are output from respective ones of a plurality of base transceiver stations for transmission, wherein the combining circuit is configured to combine the plurality of RF signals into a combined signal that is connected to an output port for supply to an antenna assembly, wherein the combining circuit combines the plurality of RF signals into the combined signal such that the plurality of RF signals are transmitted in a time division duplex (TDD) manner via the antenna assembly;
a plurality of frequency selective RF power detectors configured to receive an output from a respective one of the plurality of base transceiver stations, wherein each RF power detector is further configured to generate an output that indicates presence or absence of RF power at the frequency in the output of the respective base transceiver station;
a controller coupled to the plurality of frequency selective RF power detectors, wherein the controller is configured to generate a control signal based upon the outputs of the plurality of RF power detectors; and
an oscillator coupled to the controller and to the combining circuit, wherein the oscillator is configured to be responsive to the control signal generated by the controller to generate a carrier signal at the frequency for use in synchronizing transmission of the individual RF signals in the combined signal via the antenna assembly;
wherein the controller is configured to generate the control signal that turns off the oscillator when any of the plurality of RF power detectors detects absence of RF power at the frequency so that the oscillator does not generate the carrier signal at the frequency, and is configured to generate the control signal that turns on the oscillator when all of the plurality of RF power detectors detect presence of RF power at the frequency so that the oscillator generates the carrier signal at the frequency.

2. The apparatus of claim 1, wherein the combiner circuit is further configured to split an RF signal received by the antenna assembly into a plurality of receive signals for respective ones of the plurality of base transceiver stations.

3. The apparatus of claim 1, and further comprising at least one diode that is configured to couple direct current (DC) power from at least one of the base transceiver stations to an output port that connects the combined signal to the antenna assembly.

4. The apparatus of claim 3, wherein the diode has an anode connected to the at least one base transceiver station and a cathode connected to the output port for directing DC power from the at least one base transceiver station to the antenna assembly.

5. The apparatus of claim 3, and further comprising a surge protection device coupled between the diode and ground and configured to dissipate a power surge that exceeds a predetermined threshold voltage.

6. A system comprising:
a plurality of base transceiver stations each of which is configured to output a radio frequency (RF) signal at the same frequency for transmission;
a combiner apparatus coupled to the plurality of base transceiver stations and comprising a plurality of combining circuits configured to combine the plurality of RF signals into a combined signal, the combiner apparatus is further configured to detect presence or absence of RF power at the frequency in the outputs of the respective base transceiver stations for determining whether to generate a carrier signal at the frequency for synchronizing transmission of the plurality of RF signals in the combined signal in a time division duplex (TDD) manner, wherein the combiner apparatus comprises:
a controller coupled to the plurality of RF power detectors and configured to generate a control signal based on outputs of the plurality of RF power detectors;
an oscillator coupled to the controller that is configured to generate the carrier signal in response to the control signal;
wherein the controller is configured to generate the control signal that turns off the oscillator when any of the plurality of RF power detectors detects absence of RF power at the frequency so that the oscillator does not generate the carrier signal at the frequency, and is configured to generate the control signal that turns on the oscillator when all of the plurality of RF power detectors detect presence of RF power at the frequency so that the oscillator generates the carrier signal at the frequency;
an amplifier coupled to the combiner for amplifying the combined signal;
a coax cable coupled between the combiner apparatus and the amplifier;
an antenna coupled to the amplifier for transmitting the amplified combined signal.

7. The system of claim 6, wherein the combiner apparatus comprises a plurality of frequency selective RF power detectors each configured to receive an output from respective ones of the plurality of base transceiver stations and further configured to generate an output indicating presence or absence of RF power at the frequency in the output of the respective base transceiver station frequency.

8. The system of claim 6 wherein the combiner comprises at least one diode that is configured to couple direct current (DC) power output from at least one of the plurality of base transceiver stations to the coax cable.

9. The system of claim 8, wherein the combiner apparatus is further configured to split an RF signal received by the antenna into a plurality of receive signals for respective ones of the plurality of base transceiver stations.

10. The system of claim 8, wherein the combiner comprises a surge protection device coupled between the diode and configured to dissipate a power surge that exceeds a predetermined threshold voltage.

11. An apparatus comprising:
at least one combining circuit coupled to receive a plurality of RF signals each at the same frequency, wherein the plurality of RF signals are output from respective ones of a plurality of base transceiver stations for transmission, wherein the combining circuit is configured to combine the plurality of RF signals into a combined signal that is connected to an output port which is in turn connected to an antenna assembly, wherein the combining circuit combines the plurality of RF signals into the combined signal such that the plurality of RF signals are transmitted in a time division duplex (TDD) manner via the antenna assembly;
a plurality of frequency selective RF power detectors configured to receive an output from a respective one of the plurality of base transceiver stations, wherein each RF power detector is further configured to generate an output that indicates presence or absence of RF power at the frequency in the output of the respective base transceiver station;
a controller coupled to the plurality of frequency selective RF power detectors, wherein the controller is configured to generate a control signal based upon the outputs of the plurality of RF power detectors;
an oscillator coupled to the controller and to the combining circuit, wherein the oscillator is configured to be responsive to the control signal generated by the controller to generate a carrier signal at the frequency for synchronizing transmission of the individual RF signals in the combined signal via the antenna assembly; and
a surge protection device coupled to the outputs of the base transceiver stations via one or more diodes for dissipating a power surge that exceeds a predetermined threshold voltage;
wherein the controller is configured to generate the control signal that turns off the oscillator when any of the plurality of RF power detectors detects absence of RF power at the frequency so that the oscillator does not generate the carrier signal at the frequency, and is configured to generate the control signal that turns on the oscillator when all of the plurality of RF power detectors detect presence of RF power at the frequency so that the oscillator generates the carrier signal at the frequency.

12. The apparatus of claim 11, and further comprising an inductor connected between each frequency selective RF power detector and the output of a respective base transceiver station.

13. The apparatus of claim 11, wherein the combiner circuit is further configured to split an RF signal received by the antenna assembly into a plurality of receive signals for respective ones of the plurality of base transceiver stations.

* * * * *